United States Patent [19]
Bank et al.

[11] Patent Number: 5,252,894
[45] Date of Patent: Oct. 12, 1993

[54] ENERGY SAVING FLOURESCENT LAMP CONTROLLER

[75] Inventors: Abraham H. Bank, Long Beach, Calif.; Ralph E. Hearn, Chehalis, Wash.

[73] Assignee: T.T.I. Corporation, Signal Hill, Calif.

[21] Appl. No.: 862,455

[22] Filed: Apr. 2, 1992

[51] Int. Cl.$^5$ .............................................. H05B 41/36
[52] U.S. Cl. ..................................... 315/307; 315/297
[58] Field of Search ............... 315/121, 133, 162, 175, 315/291, 297, 307, 313, 360, 362

[56] References Cited

U.S. PATENT DOCUMENTS 4,434,388  2/1984  Carver et al. ..................... 315/307

Primary Examiner—Steven Mottola
Attorney, Agent, or Firm—Stetina and Brunda

[57] ABSTRACT

An energy saving fluorescent lamp controller includes a current sensor together with a controlled circuit producing a timer signal in response to increased current drawn by a fluorescent lighting system. The timer responds to the control signal by producing a fixed duration operation signal which is applied to a switching system within the power coupling to the fluorescent lamp array. A pair of alternative power coupling networks are utilized to alternatively operate the fluorescent lamps at either of two different voltages in response to the control circuit and switching system. Audible and visual indicating alarms are utilized to alert the operator to the operating state of the system.

5 Claims, 4 Drawing Sheets 5,252,894

ENERGY SAVING FLOURESCENT LAMP CONTROLLER

FIELD OF THE INVENTION

This invention relates generally to fluorescent lamp lighting systems and particularly to those which facilitate energy saving control thereof.

BACKGROUND OF THE INVENTION

Fluorescent lamps have become extremely popular and well known within a variety of lighting systems. The popularity is due in large part to the excellent qualities of light produced together with the reduced amount of undesired heat production when compared with other systems such as incandescent lamps. In addition, the greater length of the elongated light producing tubes of fluorescent lamps provides extended large area lighting capabilities not enjoyed by competing lamp systems. A typical fluorescent lamp includes an elongated usually frosted glass tube formed in a straight line or curved shape. The glass tube is filled with a fluorescing gas and electrodes are positioned at each end of the glass tube. The fluorescent lamp produces light when energized by a suitable power source using the well known gas discharge phenomenon.

One of the more interesting characteristics of fluorescent lamps is their ability to operate at substantially reduced power levels once the gas discharge has been initiated during starting. Thus, typical fluorescent lamps require a higher power level to initiate the light producing gas discharge effect but thereafter may be operated at substantially reduced voltages. In attempts to provide energy saving in fluorescent lamp systems, practitioners in the art have utilized this effect to provide a variety of energy conserving systems which facilitate reduced power operation once the fluorescent action has been initiated or "started".

For example, U.S. Pat. No. 4,513,224 issued to Thomas sets forth a FLUORESCENT-LIGHTING-SYSTEM VOLTAGE CONTROLLER having a three phase transformer which includes three autotransformer windings each used for developing two reduced voltages. Three contactors selectively couple the full voltage and reduced voltages to the lighting systems. The contactors are switched in closed transition fashion to avoid power interruptions. An additional contactor is used for opening the winding neutral connections during the switching operation.

U.S. Pat. 4,766,352 issued to Widmayer sets forth a METHOD AND APPARATUS FOR STARTING AND OPERATING FLUORESCENT LAMP AND AUXILIARY BALLAST SYSTEMS AT REDUCED POWER LEVELS in which a capacitor is selected to provide effective starting of rapid start, preheat, and instant start type fluorescent lamps. A standard AC operated ballast transformer is operated at reduced power levels to achieve energy conservation. The capacitor is connected in series with the ballast primary winding and is selected to have a value producing ferro-resonance within the ballast transformer primary circuit.

U.S. Pat. No. 4,527,099 issued to Capewell, et al. sets forth a CONTROL CIRCUIT FOR GAS DISCHARGE LAMPS which includes anti-parallel connected controlled rectifiers connected in series with an AC source and the ballast and anti-parallel connected controlled rectifiers. A current limiting and energy diversion capacitor is series connected with the rectifiers and in shunt with the ballast. The controlled rectifiers of the series and shunt switching assemblies are controlled such that in any given half wave, the related controlled rectifier of the shunt switching means turn on to discharge a capacitor into the normally conducting controlled rectifier of the series switching means to produce a notch in the voltage waveform applied to the inductive ballast.

U.S. Pat. No. 4,464,606 issued to Kane sets forth a PULSE WIDTH MODULATED DIMMING ARRANGEMENT FOR FLUORESCENT LAMPS which includes a base driven high frequency push-pull transistorized inverter circuit used for energizing the lamps. The inverter is pulse width modulated to effect dimming. Transistor circuitry is provided for insuring rapid turn on and turn off of the inverter transistors. A photoresponsive sensor responds to ambient light and illumination produced by the lamps to control the pulse width modulator accordingly.

U.S. Pat. No. 4,435,670 issued to Evans, et al. sets forth an ENERGY CONSERVING INSTANT START SERIES SEQUENCE FLUORESCENT LAMP SYSTEM WITH OVERCURRENT PROTECTION which includes a power reducing capacitor connected in series with one or both of the lamps in a two lamp system. A protective device is connected within the circuit of the first lamp such that the high current flow produced by failure of the second lamp to start activates the protective device and prevents the system from being damaged.

U.S. Pat. No. 4,434,388 issued to Carver, et al. sets forth an ELECTRICAL LIGHTING CONTROLLER which is connected between a power line and a bank of lamps or other electrical energy consuming devices. The output level applied to the lamps is controlled by a variable autotransformer having a drive motor which in turn is controlled by an amplifier comparator circuit.

U.S. Pat. No. 4,339,690 issued to Regan, et al. sets forth an ENERGY SAVING FLUORESCENT LIGHTING SYSTEM which includes a reactants modifying capacitor coupled in series with first and second fluorescent lamps. A filament switch is operative to conduct filament heating current during the starting of the first lamp. The filament switch is coupled between filaments at opposite ends of the first fluorescent lamp and triggers to a low impedance state in response to the lamp starting voltage.

U.S. Pat. No. 4,256,993 issued to Morton sets forth an ENERGY SAVING DEVICE FOR RAPID-START FLUORESCENT LAMP SYSTEM which is connected in series with one lamp of a two lamp rapid start fluorescent light system. The device includes a normally closed relay within the electrode circuit of one of the lamps and a power reducing capacitor in shunt with one of the relays contacts. Upon turning on the system, a solid state time delay and relay coil energizing circuit is actuated which opens the relay contacts only after the lamps have been started placing the shunt capacitor in series with the operating lamps to reduce the nominal power consumption.

U.S. Pat. No. 4,135,115 issued to Abernethy, et al. sets forth a WATTAGE REDUCING DEVICE FOR FLUORESCENT FIXTURES comprising the combination of a step up transformer, a resistor and two capacitors all of which are mounted externally of the ballast. The desired is wired in series with the ballast and one of the lamps to allow normal ballast voltages to be delivered to the lamp circuit.

U.S. Pat. No. 4,859,914 issued to Summa sets forth a HIGH FREQUENCY ENERGY SAVING BALLAST which provides energizing signals characterized by frequencies in the range from about sixty hertz to thirty megahertz. An oscillator and transformer provide the energizing signals which are transformer coupled to the lamp circuits.

U.S. Pat. No. 4,870,340 issued to Kral sets forth a METHOD OF AND APPARATUS FOR REDUCING ENERGY CONSUMPTION which includes switching apparatus for switching the load voltage off at arbitrary positions in the sine wave of the AC power applied while simultaneously providing a commutating path for any inductive current.

U.S. Pat. No. 4,965,492 issued to Boldwyn sets forth a LIGHTING CONTROL SYSTEM AND MODULE which includes a microprocessor control utilized to operate the lighting system at reduced power level while maximizing efficiency. The microprocessor and control circuitry continuously monitors the power applied and maintains the desired power level to maintain the preestablished light level selected.

While the foregoing described prior art systems have in various ways achieved energy saving and in many instances improved lighting characteristics, they are often complex and expensive to install and maintain. Thus, there remains a continuing need in the art for evermore improved and reliable lighting control systems which provide energy savings to the consumer.

SUMMARY OF THE INVENTION

Accordingly, it is a general object of the present invention to provide an improved fluorescent lamp controller. It is a more particular object of the present invention to provide an improved fluorescent lamp controller which saves energy. It is a still more particular object of the present invention to provide an improved energy saving fluorescent lamp controller which utilizes a simple low cost and reliable control circuit.

In accordance with the present invention, there is provided a fluorescent lamp controller comprises: sensing means for sensing current surges within an AC power supply; processor means responsive to the sensing means for producing an increased operating voltage for the fluorescent lamp; and timing means for reducing the increased voltage following a predetermined interval.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
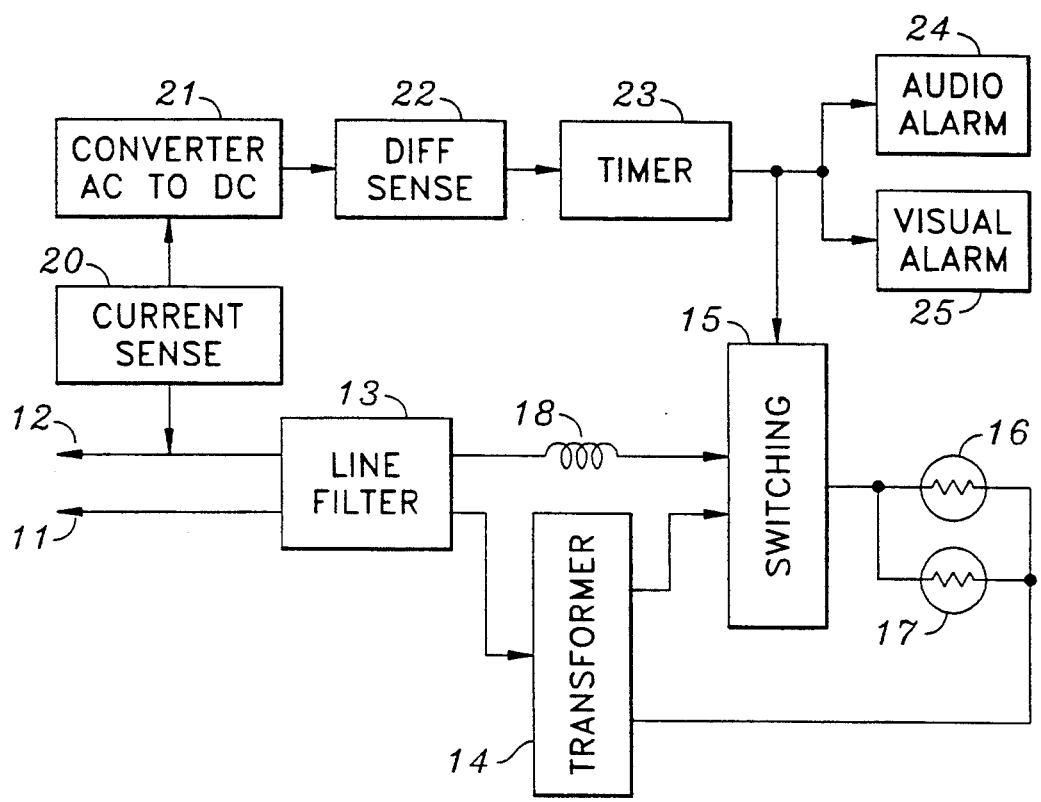
FIG. 1 sets forth a block diagram of the present invention fluorescent lamp controller.

FIG. 1 sets forth a block diagram of an energy saving fluorescent lamp controller constructed in accordance with the present invention and generally referenced by numeral 10. A line power filter 13 is coupled to a source of AC power by connections 11 and 12 in accordance with general fabrication techniques. A pair of fluorescent lamps 16 and 17 constructed in accordance with conventional fabrication techniques are coupled in a parallel circuit arrangement to a switching circuit 15 and a power transformer 14. Power transformer 14 is coupled to line filter 13 and to switch 15. An inductive impedance 18 preferably formed of an inductive coil is coupled between the remaining input of switch 15 and line filter 13.

A current sensor 20 is coupled to the input alternating current supply at a convenient point such as one side of line input 12. Sensor 20 is further coupled an AC to DC signal converter 21 which is coupled to a differential sensor 22. The output of differential sensor 22 is coupled to the trigger input of a timer 23. Timer 23 includes an output connection which is coupled to the control input of switching circuit 15. An audible alarm 24 and visual indicator 25 are also coupled to the control output of timer 23.

In operation, the alternating current power available at line inputs 11 and 12 is coupled by filter 13 to transformer 14 and inductive impedance 18 to provide alternative coupling pads for the alternating current power to fluorescent lamps 16 and 17. The condition of switch 15 determines whether lamps 16 and 17 are coupled to filter 13 through transformer 14 or inductive impedance 18. In accordance with the preferred form of the invention, the coupling path to lamps 16 and 17 provided by inductive impedance 18 applies a substantially greater voltage to lamps 16 and 17 while the coupling path through transformer 14 provides a substantially lower voltage power coupling. In further accordance with the intended operation of the present invention system, the normal or steady state operation of lamps 16 and 17 is provided by the coupling path through switch 15 which couples power through transformer 14 at a reduced voltage thereby saving substantial energy.

Lamps 16 and 17 are representative of a plurality of fluorescent lamp devices each of which should be understood to be operable by the consumer alone or in groups using conventional wall switches or similar devices within the lighted area served by the plurality of fluorescent lamps. Thus, in a typical operation environment, the changing needs of the consumer may from time to time cause one or more of the fluorescent lamps represented by lamps 16 and 17 to be turned on or off as the consumer wishes. It should also be recalled that the Operating characteristic of such fluorescent lamps requires a substantially greater applied voltage to initiate the lamp operation afterwhich a reduced voltage is sufficient to continue or sustain the lamp operation.

Current sensor 20 is coupled to the alternating current supply feeding lamps 16 and 17 using any convenient coupling means. In its preferred form, sensor 20 is coupled to line input 12 using the inductive coupling of a toroidal coil or the like. The essential element is that sensor 20 receives an alternating current sample representative of the alternating current being supplied to lamps 16 and 17. In accordance with the operation set forth below in greater detail, sensor 20 and converter 21 cooperate to produce an output control signal proportional to the current being supplied to lamps 16 and 17. Differential sensor 22 detects significant increases in the output voltage of converter 21 indicative of current increases demanded by lamps 16 and 17 and in response thereto produces a trigger signal which is coupled to timer 23 in a manner causing timer 23 to initiate a timing cycle. Timer 23 is constructed in accordance with conventional fabrication techniques to produce a predetermined duration output signal each time a trigger signal is applied to the trigger input of the timer. This output signal is coupled to switch 15 causing the power coupling of lamps 16 and 17 to be switched from the lower power coupling of transformer 14 to the higher power coupling through inductive impedance 18. Concurrently, the output signal of timer 23 activates audible alarm 24 and visual indicator 25 to warn the operator that the control system has switched to the higher power mode of operation. The greater voltage coupled to lamps 16 and 17 through inductive impedance 18 provides the power increase necessary to meet the increase in supply current demands sensed by the system. The increased power coupling is maintained throughout the duration of the operation of timer 23. Once timer 23 has cycled through one operating period, the output signal to switch 15 as well as audible alarm 24 and visual indicator 25 is terminated. Switch 15 then returns the power coupling of lamps 16 and 17 to transformer 14 and thus returns the system to the energy saving lower power mode of operation. The duration of output signal provided by timer 23 is selected in accordance with design preference. It has been found advantageous to select a cycle duration of approximately thirty to sixty seconds and thereby provide ample time to energize additional fluorescent lamps being turned on by the consumer.

In essence, the present invention system senses increased current demands by the fluorescent lamp plurality and interprets such current increases as an indication that additional fluorescent lamps are being turned on within the system. In response, the input voltage to the lamp system is raised to provide a more advantageous starting voltage which is maintained for a sufficient time to complete the operational start of such additional activated fluorescent lamps. Following this time duration, the system then returns to the normal energy saving mode of operation.

Figure 2A:
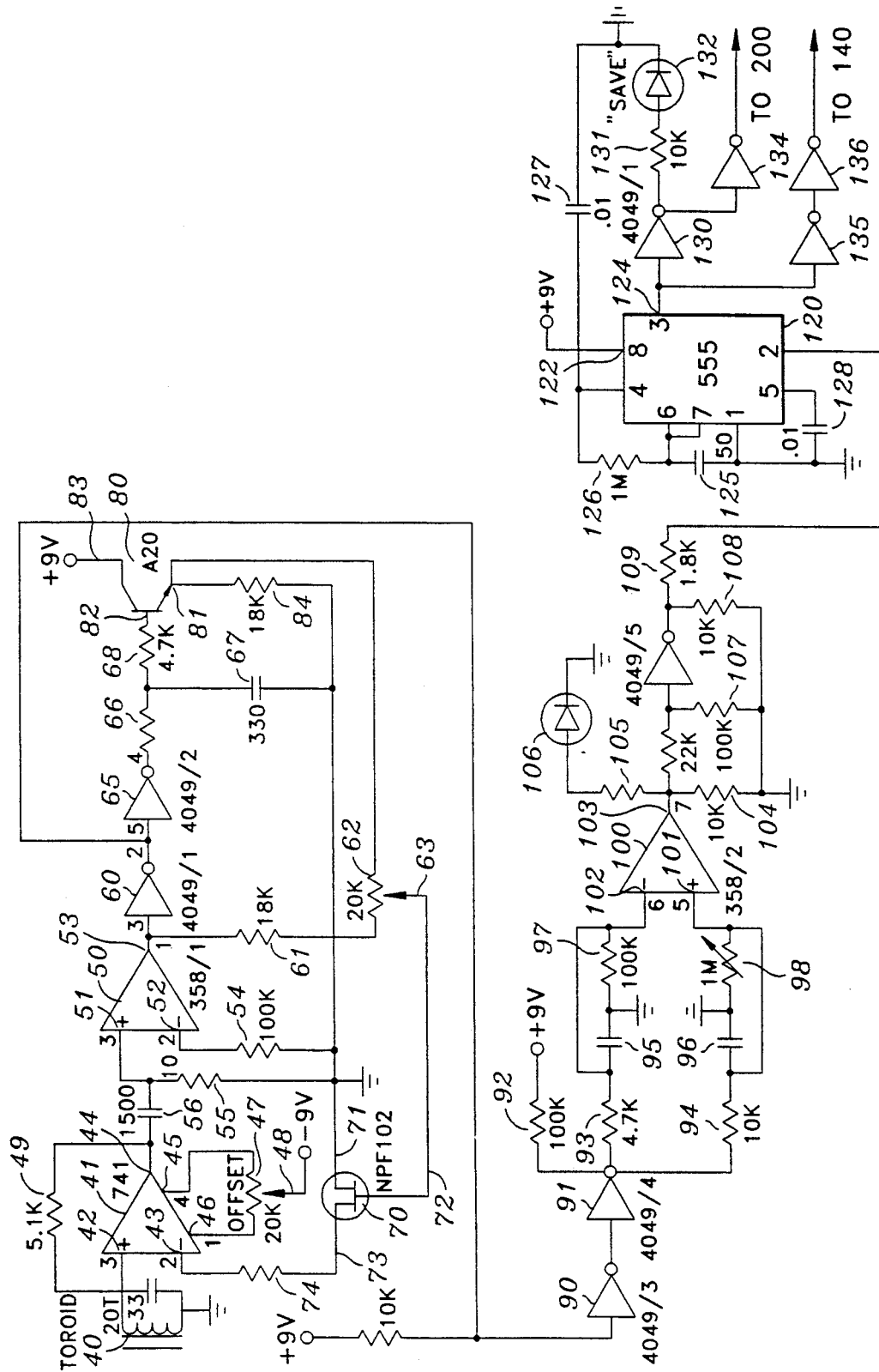
FIGS. 2A, 2B and 2C taken together set forth a schematic diagram of the present invention fluorescent lamp controller.
Figure 2B:
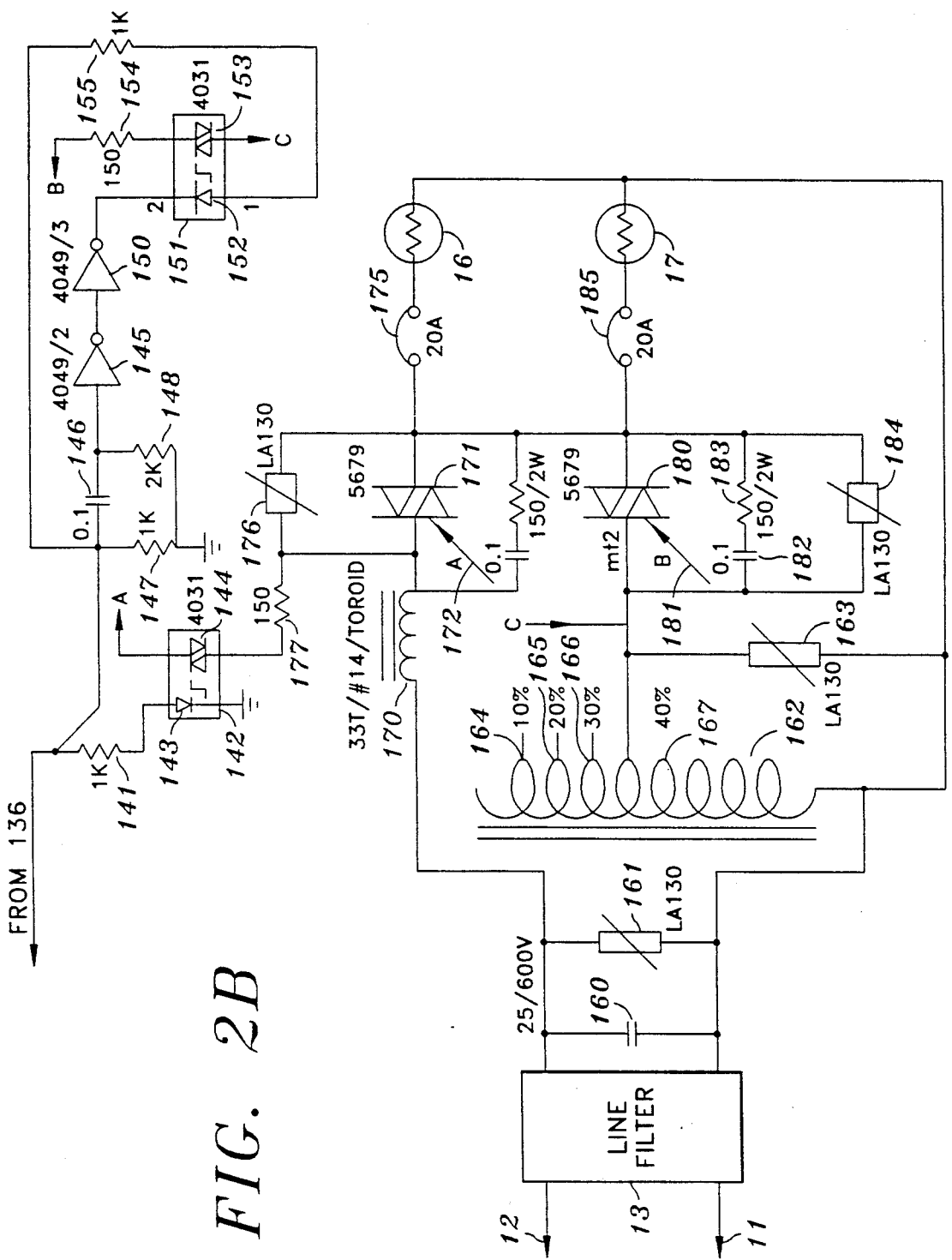
Figure 2C:
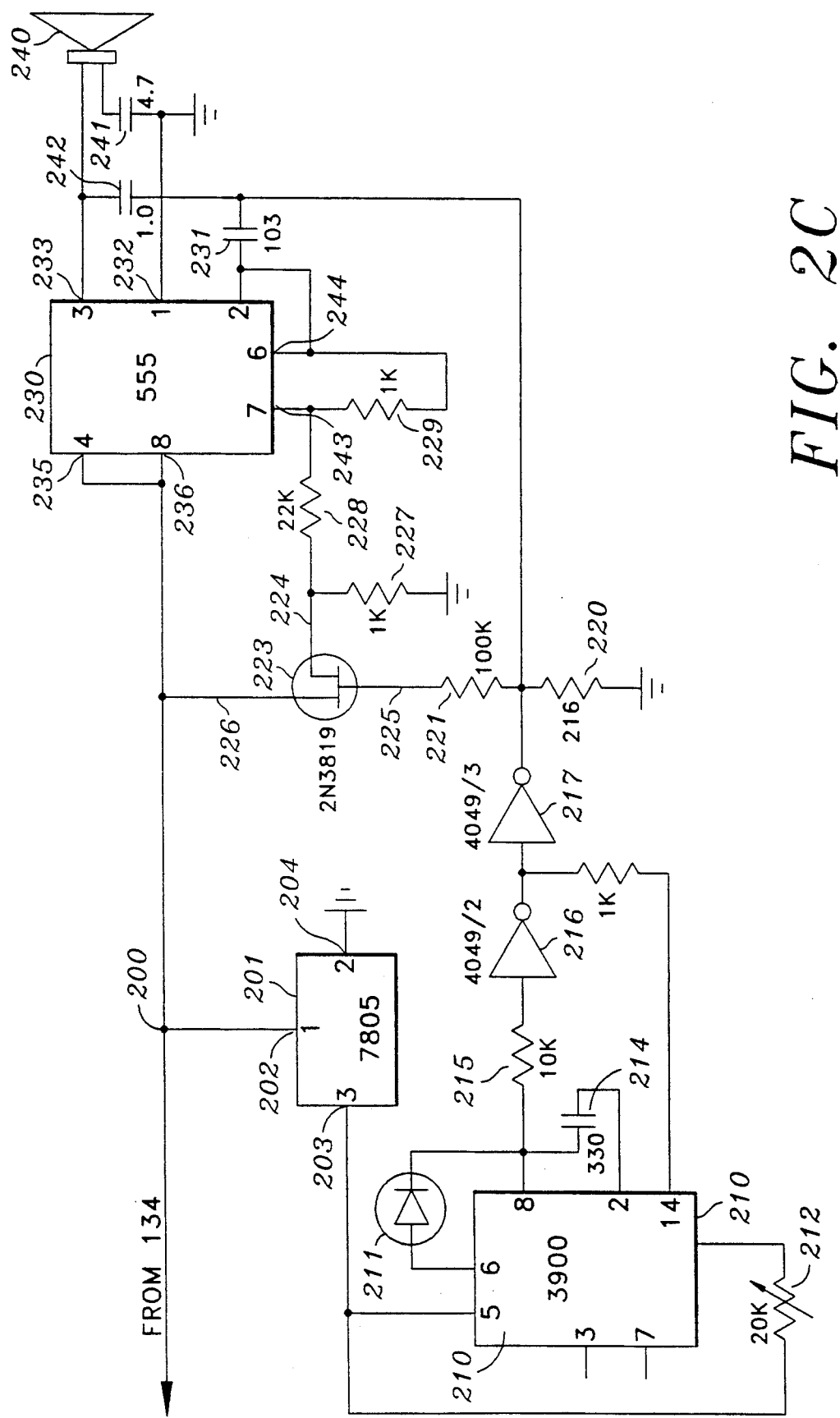

FIGS. 2A, 2B and 2C when taken together set forth a more detailed schematic diagram of the present invention fluorescent lamp controller as well as the operative coupling to the fluorescent lamp plurality. Once again, it should be understood that lamps 16 and 17 are representative of a plurality of fluorescent lamps which may be varied in number in accordance with the user's preference. By way of overview, FIG. 2A may be generally understood to include the system components corresponding to current sensor 20, converter 21, differential sensor 22 and timer 23 as set forth in FIG. 1. Similarly, FIG. 2B may be generally understood to include line filter 13, transformer 14, inductive impedance 18, switch 15 and lamps 16 and 17 set forth in FIG. 1. Finally, FIG. 2C may be generally understood to correspond to audible alarm 24 and visual indicator 25. It will be apparent, however, that this overview is provided to generally orient the reader and certain system components and elements within FIGS. 2A through 2C are associated with several of the operative system blocks within FIG. 1.

With specific reference to FIG. 2A, a high gain amplifier 41 includes an input 42 coupled to a toroidal coil 40 and an input 43. A bias adjustment potentiometer 47 is coupled to terminals 45 and 46 of amplifier 41. A feedback resistor 49 is coupled from output 44 of amplifier 41 to input 42. The basic operation of amplifier 41 is the provision of an extremely high gain amplification of the alternating current signal sensed by toroidal coil 40. As described above, toroidal coil 40 is coupled to the input alternating current supply which energizes lamps 16 and 17. Thus, the amplitude of signal at input 42 is representative of the current supplied to the plurality of fluorescent lamps within the system. Potentiometer 47 is adjusted to provide an operating bias to amplifier 41 which produces a nonlinear high gain operation and thus the output signal of amplifier 41 comprises an amplified nonlinear alternating voltage signal. The high gain output of amplifier 41 is coupled by a coupling capacitor 56 to an input 51 of a second amplifier 50. A resistor 55 couples input 51 to ground and the resulting coupling through capacitor 5 and resistor 55 provides a DC signal component at input 51 of amplifier 50. In addition, capacitor 56 and resistor 55 cooperate to reduce any noise signal components which may be present at the output of amplifier 41 due to lying transients and other noise components typical of alternating current power systems. It should be noted that while some alternating current component may be present at input 51 of amplifier 50, the operative signal component desired by the system is found in the DC signal component which, as mentioned above, is proportional to the current sensed by toroidal coil 40. The amplified output of amplifier 50 is coupled to a pair of inverter buffers 60 and 65 which provide power gain and buffering for the DC signal output and which are coupled to base 82 of an NPN transistor 80. Transistor 80 forms an emitter follower having an output signal at emitter 81 which is coupled to a feedback network formed by a potentiometer 62 and a resistor 61. Potentiometer 62 includes a movable contact 63 which produces a feedback signal applied to a field effect transistor 70 having a source electrode 71 coupled to ground, a gate electrode 72 coupled to contact 63 and a drain electrode 73 coupled to input 43 of amplifier 40 by a resistor 74.

Transistor 80 and field effect transistor 70 cooperate to provide a stabilizing feedback signal which is applied to input 43 of amplifier 41 to stabilize the high gain operation of amplifier 41. The output of inverter buffer 60 is coupled to an additional pair of inverter buffers 90 and 91 which provide further buffering for the DC signal produced by amplifiers 41 and 50.

An amplifier 100 includes a pair of inputs 101 and 102 and an output 103. A resistive capacitive coupling network formed by resistors 93 and 97 together with capacitor 95 couples the output signal of buffer 91 to input 102 of amplifier 100. A second resistive capacitive network formed by resistors 94 and 98 and capacitor 96 further couples the output signal of inverter 91 to input 101 of amplifier 100. Amplifier 100 is configured to provide an output signal in response to a voltage difference between the voltages applied to inputs 101 and 102. In accordance with the preferred operation of the present invention system, the relative resistance and capacitance coupling the DC signal from buffer 91 to inputs 101 and 102 is selected to cause the coupling network to input 102 to respond more quickly to DC signal increases than the coupling network to input 101. Thus, each time the DC current proportional signal increases indicating a supply current increase to the fluorescent lighting system, the rise of DC voltage at the output of inverter 91 is communicated more quickly to input 102 of amplifier 100 causing a differential between inputs 101 and 102 which in turn produces an output signal at output 103 of amplifier 100. As a result, amplifier 100 performs as a differential comparator producing an output signal each time a significant increase in current demand within the fluorescent lighting system is sensed. It will be understood by those skilled in the art that the various filtering operations occurring between toroid 40 and buffer 91 produce substantial noise immunity causing amplifier 100 to be relatively noise immune and restricting its operation to significant changes of fluorescent lamp current.

The output signal of amplifier 100 is coupled by buffer 110 to a trigger input 121 of timer 120. In addition, the output signal of amplifier 100 is further coupled to a light emitting diode 106 which provides a convenient visual indication of a detected line current increase.

Timer 120 is constructed generally in accordance with conventional fabrication techniques and, in its preferred form, comprises an integrated circuit having a general device number 555. For convenience, the terminal numbers are maintained on the depiction of integrated circuit 555 forming timer 120. Timer 120 includes a plurality of timing capacitors 124 and 125 as well as a ground connection 123, a supply connection 122 and an output connection 124. Timer 120 is configured such that the application of a trigger signal at input 121 causes the output voltage at output 124 to increase in a positive direction for a time interval determined by capacitors 124 and 125. As mentioned above, it has been found convenient to use a timing interval of approximately thirty to sixty seconds with thirty seconds being a preferred time interval. Thus, timer 120 produces a positive signal having a thirty second duration each time a trigger signal is applied to input 121. This output signal is coupled by a pair of inverter buffers 135 and 136 to input 140 of the circuit portion shown in FIG. 2B. An additional inverter 130 couples the output signal of timer 120 to a panel indicator light emitting diode 132 through a resistor 131. The inversion of inverter 130 causes LED 132 to be turned on in the absence of an output pulse from timer 120 and to be turned off during the thirty second pulse interval. The output of inverter 130 is further coupled by an inverter 134 to connection 200 of the portion of the present invention circuit shown in FIG. 2C.

Thus, the portion of the present invention circuit shown in FIG. 2A operates to sense the alternating current supply to the plurality of fluorescent lamps and amplify and convert the sensed current signal to a DC control signal proportional to the supply current. The differential comparator provided by amplifier 100 and its resistive capacitive coupling networks produces an output signal in response to a current increase which is used to operate timer 120 and light emitting diode 106. Timer 120 provides a pair of thirty second duration output signals which are utilized by the circuit portions shown in FIGS. 2B and 2C to switch the power coupling to the fluorescent lamps and provide visual and audible alarm indicators respectively.

With specific reference to FIG. 2B, line filter 13, constructed in accordance with the present invention, is coupled to a source of operating alternating current power by a pair of connections 11 and 12. Filter 13 provides noise filtering and is coupled to a power factor correction capacitor 160 to provide a relatively clean alternating current power supply suitable for operating a plurality of fluorescent lamps such as lamps 16 and 17. A varister 161, preferably formed of a metal oxide varister fabrication, is coupled in parallel with power faction correction capacitor 160 to further filter the applied alternating current power. A transformer 162 comprises a conventional autoformer type transformer having a plurality of voltage taps 164, 165, 166 and 167. In accordance with conventional fabrication techniques, the output voltage of transformer 162 is controlled in part by the selection of the appropriate one of taps 164 through 167. In the circuit shown in FIG. 2B, tap 167 is selected as the output tap and is coupled to lamps 16 and 17 by a triac element 180. Triac 180 is constructed in accordance with conventional fabrication techniques and preferably comprises a device having device number 5679. Triac 180 includes a trigger or gate electrode 181 which controls the operation of triac 180. A varister 163 is coupled between tap 167 and the bottom end of transformer 162 to provide further filtering and surge protection. A series combination of a capacitor 182 and a resistor 183 is coupled in parallel with triac 180. In addition, a varister 184 is also coupled in parallel with triac 180. The output of triac 180 is coupled by a fuse 185 to lamp 17. As described above, lamps 16 and 17 are parallelly coupled and a fuse 175 is shown in series with lamp 16.

A second power coupling is provided between line filter 13 and the parallel combination of lamps 16 and 17 by a second triac 171 having a trigger or gate 172. An inductance impedance 170 is coupled between triac 171 and line filter 13 to provide the above-described inductive impedance shown as impedance 18 in FIG. 1. While different inductive impedances may be used for inductor 170, it has been found advantageous to use a conventional toroidal coil.

Thus, alternating current power may be coupled by the circuit of FIG. 2B between filter 13 and the plurality of lamps represented by lamps 16 and 17 using either of two coupling paths. The first coupling path is provided by transformer 162 and is employed each time triac 180 is turned on. The second coupling path is provided by toroid 170 and is operative when triac 171 is turned on. The relative couplings provided by the circuit of FIG. 2B are selected such that the coupling path through transformer 162 and triac 180 applies a substantially reduced voltage to provide energy conservation while the coupling path provided by inductance 170 and triac 171 provides a higher voltage coupling used to initiate the starting action of lamps 16 and 17. Thus, by controlling the operation of triacs 171 and 180, the present invention system is able to control the applied power to lamps 16 and 17.

As described above in FIG. 2A, the output signal from timer 120 comprising a thirty second duration positive going pulse is produced each time an increase in current is sensed by the circuit shown in FIG. 2A. This positive going signal is coupled to an optical coupler 142 by a resistor 141. Optical coupler 142 comprises a light emitting diode 143 and a photoresponsive sensor 144 arranged in an optical coupling path such that the energizing of diode 143 in response to the applied pulse signal provides a corresponding light energy signal which is received by sensor 144. Optical coupler 142 is employed to provide isolation while communicating the desired control signal to triac 172. Thus, in accordance with the above-described operation, the output pulse of timer 120 is coupled through optical coupler 142 to gate 172 of triac 171. Thus, each time timer 120 produces a thirty second duration positive pulse, triac 171 is energized coupling power to lamps 16 and 17 through inductance 170. The output pulse from timer 120 is further coupled by a capacitor 146 to a pair of inverter buffers 145 and 150. The output of inverter buffer 150 is coupled to a second optical coupler 151 which also comprises a device having the general device number 4031. It should be noted, however, that optical coupler 151 is oppositely oriented from the orientation shown for coupler 142. Thus, coupler 151 is energized and provides signal coupling solely during the absence of the output pulse from timer 120 and is deenergized or turned off during the occurrence of the timer output pulse. The output signal of coupler 151 is coupled to gate 181 of triac 180.

As a result, the coupling networks provided by optical couplers 142 and 151 provide alternative activation of triacs 171 and 180. Triac 180 is operated solely in the absence of an output pulse from timer 120 while triac 171 is operative solely during the occurrence of a timer output pulse. As a result, the occurrence of a timer output pulse in response to an increase of supply current to the fluorescent lamps within the system switches the power coupling for lamps 16 and 17 from transformer 162 to the higher voltage coupling of inductor 170. Once the output pulse interval of timer 120 has ended, the absence of the timer pulse causes triac 180 to be turned on and triac 171 to be turned off. The resulting operation provides energy saving coupling of operating power to lamps 16 and 17 in the absence of a current surge and a brief interval switch to a higher voltage coupling during current surges to effectively initiate fluorescent lamp turn on cycles.

With specific reference to FIG. 2C, the visible and audible alarm operations may be described. The circuit of FIG. 2C includes a tone generating circuit 230 which in its preferred form comprises an integrated circuit having a general device number 555. The 555 integrated circuit of tone oscillator 230 includes an output connection 233, a ground connection 232 and a pair of supply input voltage connections 235 and 236. Tone oscillator 230 further includes a trigger signal input 243. Inputs 235 and 236 are coupled to the positive going pulses produced by timer 120 in response to current increases. Thus, the output pulse from timer 120 having experienced a power gain due to inverter buffers 130 and 134 provides an energizing voltage for tone oscillator 230 causing tone oscillator 230 to operate solely during the output pulse interval of timer 120. Accordingly, tone oscillator 230 produces an audio frequency tone signal at output 233 during the duration of the applied timer output pulse which is converted by audio transducer 240 to an audible sound alarm signal. The choice of component for audio transducer 240 is a matter of design choice. Thus, audio transducer 240 may, for example, comprise a conventional speaker or piezoelectric transducer.

The output pulse from timer 120 is further coupled to a voltage regulating circuit 201 which produces a five volt operating supply at terminal 203 during the occurrence of the timer output pulse. A signal flashing circuit 210 includes an integrated circuit having general device number 3908. Flashing signal generator 210 further includes a timing capacitor 214 and a light emitting diode 217. A potentiometer 212 is coupled to flashing signal generator 210 to permit a bias voltage adjustment of the integrated circuit and control the flashing output signal. The output signal of flashing signal generator 210 is produced at terminal 213 thereof and is coupled to a pair of inverter buffers 216 and 217 by a series resistor 215. The output signal which comprises a periodic flashing signal produced by signal generator 210 is further coupled to gate electrode 225 of a field effect transistor 223. The periodic signal coupled to gate 225 causes field effect transistor 223 to produce a corresponding periodic signal which is coupled by resistor 228 to input terminal 243 of tone oscillator 230. The result is a periodic interruption or modulation of the audio signal by tone oscillator 230. In addition, a portion of the output signal of buffer 217 is further coupled to audio transducer 240 by a capacitor 242.

The important aspect of the alarm portion of the present invention system shown in FIG. 2C is the creation of an audible alarm signal and a flashing activation of light emitting diode 211 during the occurrence of the output pulse from timer 120. It should be recalled that the output pulse from timer 120 corresponds to the switching operation of the present invention system from the energy saving mode of operation to the higher voltage mode of operation. Thus, the alarm circuit of FIG. 2C is utilized by the system to provide visible and audible indications to the operator that the system is operating in the higher energy mode of operation permitting the operator to understand the operation of the present invention system.

What has been shown is a highly effective energy saving fluorescent lamp controller which utilizes a novel differential comparator circuit to detect the changes of current within the fluorescent lighting system and produce an operative signal which is used to energize the fluorescent lamps of the system at a higher level to assist the starting process. The operation of the higher energy state is indicated by visual and audible alarm systems to aid the operator in evaluating system performance and alert the consumer or operator to increased power usage.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in controlling a plurality of fluorescent lamps operated by an alternating current electrical supply, control means comprising:
    sensing means for sensing the current applied to said fluorescent lamps;
    converting means for converting said sensed current to a control signal;
    differential sensing means for producing an output signal in response to increases of said control signal, said differential sensing means comprising:
        a comparator having first and second inputs and an output;
        a first coupling network coupling said first input to said converting means;
        a second coupling network coupling said second input to said converting means; and
        said first and second coupling networks having different time constants;

timing means producing a fixed duration signal in response to the occurrence of said output signal; and power coupling means responsive to said timing means to apply an increased voltage to said fluorescent lamps when said fied duration signal is present and a reduced voltage in the absence of said fixed duration signal.

2. Control means as set forth in claim 1 wherein such first and second coupling networks include resistive and capacitive elements.

3. Control means as set forth in claim 2 further including a visual indicating alarm coupled to said timing means and operable during said fixed duration signal.

4. Control means as set forth in claim 3 further including an audible sound alarm coupled to said timing means and operable during said fixed duration signal.

5. Control means as set forth in claim 4 wherein said sensing means include an inductive element magnetically coupled to said alternating current electrical supply.

* * * * *